United States Patent
Kindred et al.

(10) Patent No.: US 8,180,407 B1
(45) Date of Patent: May 15, 2012

(54) AUTOMATIC REDUCTION OF BACKGROUND WIRELESS COMMUNICATION IN A MEDIA PLAYER MODE

(75) Inventors: Jonathan R. Kindred, Olathe, KS (US); Geoffrey S. Martin, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1273 days.

(21) Appl. No.: 11/752,721

(22) Filed: May 23, 2007

(51) Int. Cl.
*H04M 1/00* (2006.01)
*G05F 3/02* (2006.01)

(52) U.S. Cl. ........ 455/574; 327/544; 455/573; 455/347; 455/90.3; 455/93; 455/522; 455/13.4; 455/267; 455/257; 455/220; 455/219; 455/343.1; 455/343.2

(58) Field of Classification Search .................. 455/522, 455/93, 219–220, 257, 267, 34.1, 343.2, 455/3.01, 3.06, 127.5, 127.1, 571–574, 13.4, 455/69; 327/544; 348/14.01, 192, 522; 713/300–321

See application file for complete search history.

(56) References Cited

U.S. PATENT DOCUMENTS

| | | | |
|---|---|---|---|
| 6,510,210 B1 * | 1/2003 | Baughan | 379/90.01 |
| 6,865,398 B2 | 3/2005 | Mangal et al. | |
| 7,080,405 B2 * | 7/2006 | Himmel et al. | 726/4 |
| 7,149,504 B1 | 12/2006 | Weaver et al. | |
| 7,243,145 B1 | 7/2007 | Poortman | |
| 2004/0185918 A1 * | 9/2004 | Fan et al. | 455/574 |
| 2006/0031368 A1 * | 2/2006 | deCone | 709/207 |
| 2007/0037526 A1 * | 2/2007 | Estable | 455/74.1 |
| 2007/0075965 A1 * | 4/2007 | Huppi et al. | 345/156 |
| 2007/0129044 A1 * | 6/2007 | Chen | 455/343.1 |
| 2008/0133956 A1 * | 6/2008 | Fadell | 713/340 |

* cited by examiner

*Primary Examiner* — Olumide T Ajibade Akonai
*Assistant Examiner* — Emem Stephen

(57) ABSTRACT

A method and system for conserving battery power in a portable communication device. When a user puts the device into a media player mode such as by invoking a media player application on the device, the device will automatically reduce the extent to which it engages in background wireless transmissions, such as radio link control messaging, presence update messaging, and so forth, to help conserve battery power. In turn, when the device exits the media player mode, the device may then automatically revert to its normal extent of background wireless transmission.

19 Claims, 3 Drawing Sheets

AUTOMATIC REDUCTION OF BACKGROUND WIRELESS COMMUNICATION IN A MEDIA PLAYER MODE

FIELD OF THE INVENTION

The present invention relates to portable multi-functional devices and, more particularly, to portable communication devices having media player functionality, and to management of power consumption in such devices.

BACKGROUND

Portable communication devices, such as a cell phones and personal digital assistants have become increasingly common in recent years. Further, these devices have grown in complexity, incorporating numerous features, such as wireless data communication (e.g., web browsing, instant messaging, etc.) and media players (e.g., MP3 player and video player). Thus, while a user once had to carry separate cell phone, PDA, and media player devices in order to be able to engage in cell phone communications, maintain schedule and contact information, and listen to music, the user can now conveniently carry a single device that includes all of those functions, among others.

Unfortunately, however, the battery power on these portable devices is limited, and so a user must often charge the device. While this has always been a problem, the problem has become more acute as the portable devices have become more complex and as the devices (and thus their batteries) have become smaller. Consequently, although a user may benefit greatly from having an integrated portable device instead of numerous separate devices, the user now bears the increased burden to charge the portable device more often. An improvement is therefore desired.

SUMMARY

The present invention stems from a realization that, when a portable communication device is put into a media player mode to play locally stored media (e.g., MP3 files, videos, games, etc.), the user of the device is less likely to need or want the device's wireless communication functions. In particular, when the user puts an integrated cell phone/media player into a media player mode, the user may consider the device to be functioning as a media player rather than a cell phone. Conversely, when the user turns off the media player function of the device, the user may consider the device to be functioning as a cell phone rather than a media player.

Unfortunately, however, a portable device that has both wireless communication functionality and media player functionality normally engages in a certain extent of background wireless transmission regardless of whether it happens to be running a media player application at the time. For instance, such a device may periodically transmit registration or presence update messages to its serving wireless network and/or to various network servers, and may periodically transmit power control or other sorts of control messages to its serving wireless network. These are background wireless transmissions, as they occur automatically in the background, largely regardless of what the device happens to be doing at the time.

When a portable device is put into a media player mode, however, there is little if any need for the device to waste its battery power engaging in wireless transmissions, since the device need not function as a wireless communication device when in that mode. Consequently, in accordance with the invention, when a user puts such a device into a media player mode (or when the device otherwise enters into a media player mode), the device will automatically reduce the extent to which it engages in background wireless transmission, to help conserve battery power. In turn, when the device exits the media player mode, the device may then automatically revert to its normal extent of background wireless transmission.

In response to invocation of its media player, the device may not only run the media player but may also automatically switch into a mode of reduced background wireless communication. For instance, the device may reduce the frequency with which it transmits registrations or presence update messages and/or reduce the frequency with which it transmits power control messages or the like. Still further, the automatic reduction in background wireless communication may comprise completely ceasing some or all of its background wireless communications.

With the benefit of the invention, while the device is in the media player mode, the device may thus engage in less background wireless communication than when the device is not in the media player mode, thereby conserving battery power. Advantageously for the user, the device should therefore enjoy increased battery life.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

1. Overview

Figure 1:
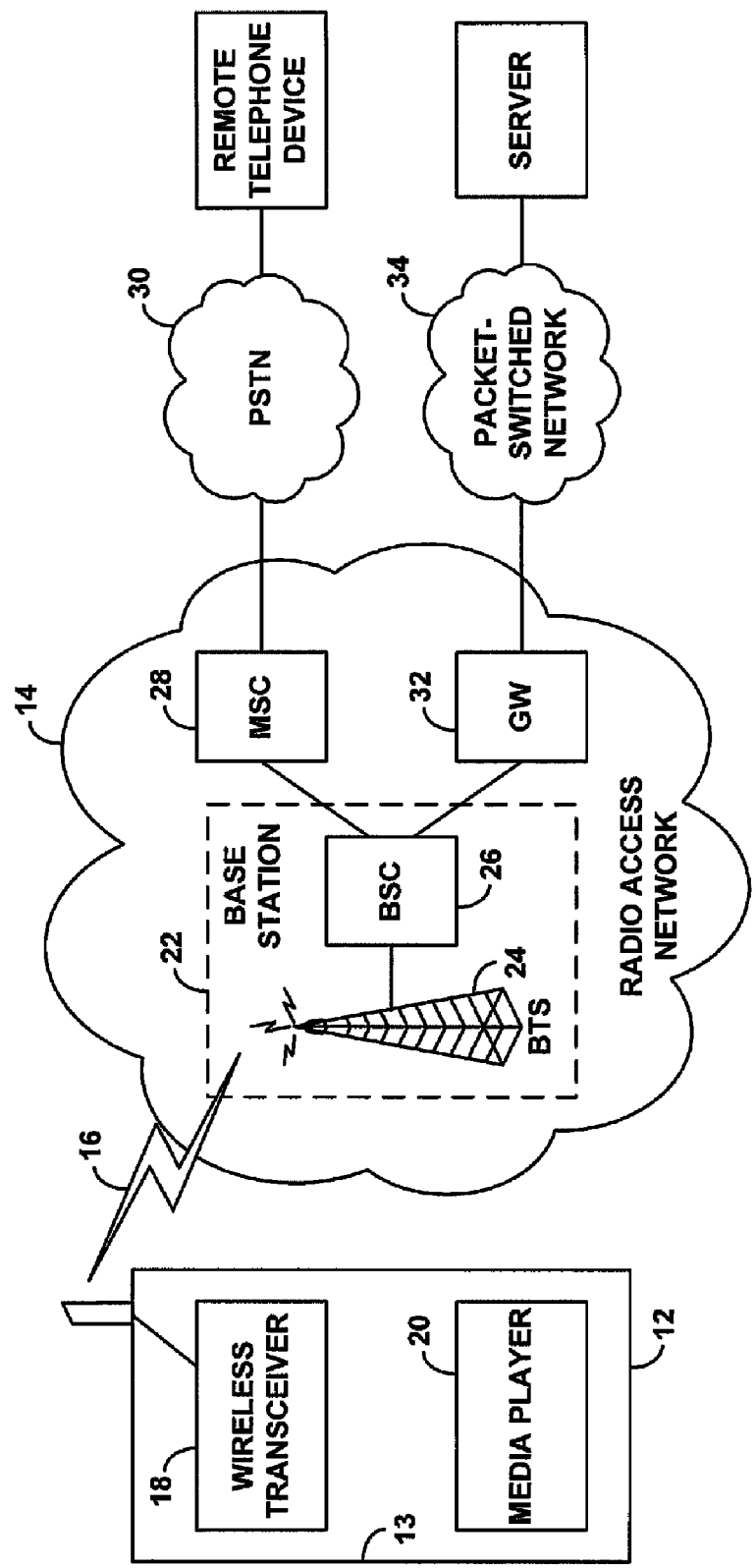
FIG. 1 is a simplified block diagram of a communication system in which an exemplary embodiment of the invention can be implemented

An exemplary embodiment of the present invention may take various forms, examples of which include an improved portable communication device and a method carried out by such a device.

In one respect, the portable communication device may include a wireless transceiver for engaging in wireless communications (such as cellular wireless communications) and a media player for playing locally stored media (such as audio, video, and/or games) to a user of the device. Such a device may normally engage in a certain extent of background wireless transmission via the wireless transceiver. However, in response to invocation of the media player, the device will automatically switch to a mode of reduced background wireless transmission, to thereby conserve battery power while the media player is running.

The certain extent of background wireless transmission may comprise a certain frequency of wirelessly transmitting registration messages, in which case the act of switching to the mode of reduced background wireless transmission may comprise switching to a mode of wirelessly transmitting the registration messages at a reduced frequency, i.e., less often.

Alternatively or additionally, the certain extent of background wireless transmission may comprise a certain frequency of wirelessly transmitting presence update messages, in which case switching to the mode of reduced background wireless transmission may comprise switching to a mode of wirelessly transmitting the presence update messages at a reduced frequency, i.e., less often. Still alternatively or additionally, the certain extent of background wireless transmission may comprise a certain frequency of wirelessly transmitting power control messages, in which case switching to the mode of reduced background wireless transmission may comprise switching to a mode of wirelessly transmitting the power control messages at a reduced frequency, i.e., less often. Other examples are possible as well.

Furthermore, the act of switching to the mode of reduced background wireless transmission may involve turning off the wireless transceiver and/or otherwise eliminating background wireless transmission altogether, or altogether ceasing background wireless transmission of one or more particular types of messages, such as registration or presence update messages or power control messages for instance.

Still further, the reduction of background wireless transmission may last for as long as the media player is running or as long as the media player is playing media. Thus, when the media player stops running (upon user request or automatically), the device may automatically revert to normally engage in the certain extent of background wireless transmission. For instance, if the device had switched to a mode of transmitting registration or presence update messages less frequency upon invocation of the media player, the device may automatically switch back its normal frequency of transmitting such messages when the media player is closed, stopped, or otherwise ended.

The media player in the exemplary device may comprise a media player program application that is executable by a processor of the device. Invocation of the media player may then comprise running the media player program application, preferably in response to receipt of user input that specifically designates the media player program application to be run (possibly selected from numerous other applications that the device can run). For instance, the user may select (e.g., engage) a link to the application presented as a GUI button or menu item on a user interface of the device, and the processor may responsively run the application.

Alternatively, the act of invoking the media player may comprise directing the media player to play media. Thus, the device may be running the media player program application but might not switch to the mode of reduced background wireless transmission until the media player receives a user instruction to play media and/or upon beginning to play media. Upon receipt of instructions to play media and/or upon beginning to play media, the device may then automatically switch to the mode of reduced background wireless transmission, so as to conserve battery power while functioning in that mode.

Preferably, the device is a handheld device such as a cellular telephone for instance, and the device has a device housing that contains a processor, data storage, and program instructions stored in the data storage and executable by the processor to perform the function of automatically switching to the reduced mode in response to invocation of the media player. Further, the wireless transceiver of the device may comprise a cellular wireless transceiver that operates to communicate over a cellular air interface with a serving radio access network.

In another embodiment, the exemplary embodiment may take the form of a method operable in a portable device to conserve battery power. The portable device may be handheld cellular telephone or other device of the type including a processor, data storage, a wireless communication interface and a user interface. The wireless communication interface may include an antenna and be arranged to send and receive signals over a radio frequency air interface in communication with a base station. The user interface may include a microphone for receiving analog speech signals from a user, a speaker for playing out analog speech signals to the user, and a display for presenting visual information to a user. And the data storage may contain media (e.g., audio media, video media, and/or gaming media) and a media player application executable by the processor to play the media to via the user interface.

The exemplary method may involve (i) receiving into the device from the user a request to run the media player application, and (ii) in response to the request, running the media player application and automatically switching the device from a mode of normal background wireless transmission to a mode of reduced background wireless transmission in order to conserve battery power while the media player application is running. Further, the method may also involve (iii) receiving into the device from the user a request to close the media player application, and (iv) in response to the request to close the media player application, closing the media player application and automatically reverting from the mode of reduced background wireless transmission to the mode of normal background wireless transmission.

In the mode of normal background wireless transmission, the device may wirelessly transmit messages at a certain frequency, and in the mode of reduced background wireless transmission, the device may wirelessly transmit the messages at a reduced frequency. Alternatively or additionally, in the mode of normal background wireless transmission, the device may wirelessly transmit a certain type of message periodically, and in the mode of reduced background wireless transmission, the device may forego transmitting the certain type of message altogether.

2. Exemplary Network Architecture

FIG. 1 is a simplified block diagram of a communication system in which the exemplary embodiment can be implemented. It should be understood, of course, that this and other arrangements and function described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

The system of FIG. 1 includes the exemplary portable device 12 served by a radio access network (RAN) 14 via a wireless air interface 16. As shown, the portable device 12 includes, within a device housing 13, a wireless transceiver 18 and a media player 20. Preferably, the device is a portable device of the type suitable for carrying in a pocket or the like, such as a cellular telephone having an integrated media player application for instance.

The RAN 14 generally functions to provide portable device 12 with wireless communication service, enabling the device to wirelessly access various network resources and/or engage in communications on one or more transport networks. As such, the RAN may take various forms and may wirelessly communicate with the portable device in various ways, the details of which are not necessarily critical.

In the arrangement shown, the RAN 14 includes a base station 22 that wirelessly communicates over air interface 16 with portable device 12 and perhaps with other served terminals. An exemplary base station may include a base transceiver station (BTS) 24 that comprises antennas and associated equipment for engaging in air interface communication, and a base station controller (BSC) or similar entity 26 that controls aspects of BTS operation and air interface communication (such as handoff between BTSs, and so forth).

The base station 22 is then connected with one or more switches or gateways that provide connectivity with one or more transport networks. As shown, for instance, the base station 22 may be coupled with a mobile switching center (MSC) 28 that provided connectivity with the public switched telephone network (PSTN) 30, so that portable device 12—if suitably equipped—can place and receive PSTN telephone calls via the RAN 14. Further, the base station 22 may be coupled with a gateway 32, such as a packet data serving node or the like, that provides connectivity with a packet-switched network 34 such as a core packet transport network or the Internet, so that portable device 12—if suitably equipped—can engage in packet data communications via the RAN 14.

Air interface communication between the RAN 14 and portable device 12 may occur in accordance with any air interface protocol now known or later developed. Examples of such protocols include, without limitation, CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared. Other examples are possible as well.

Figure 2:
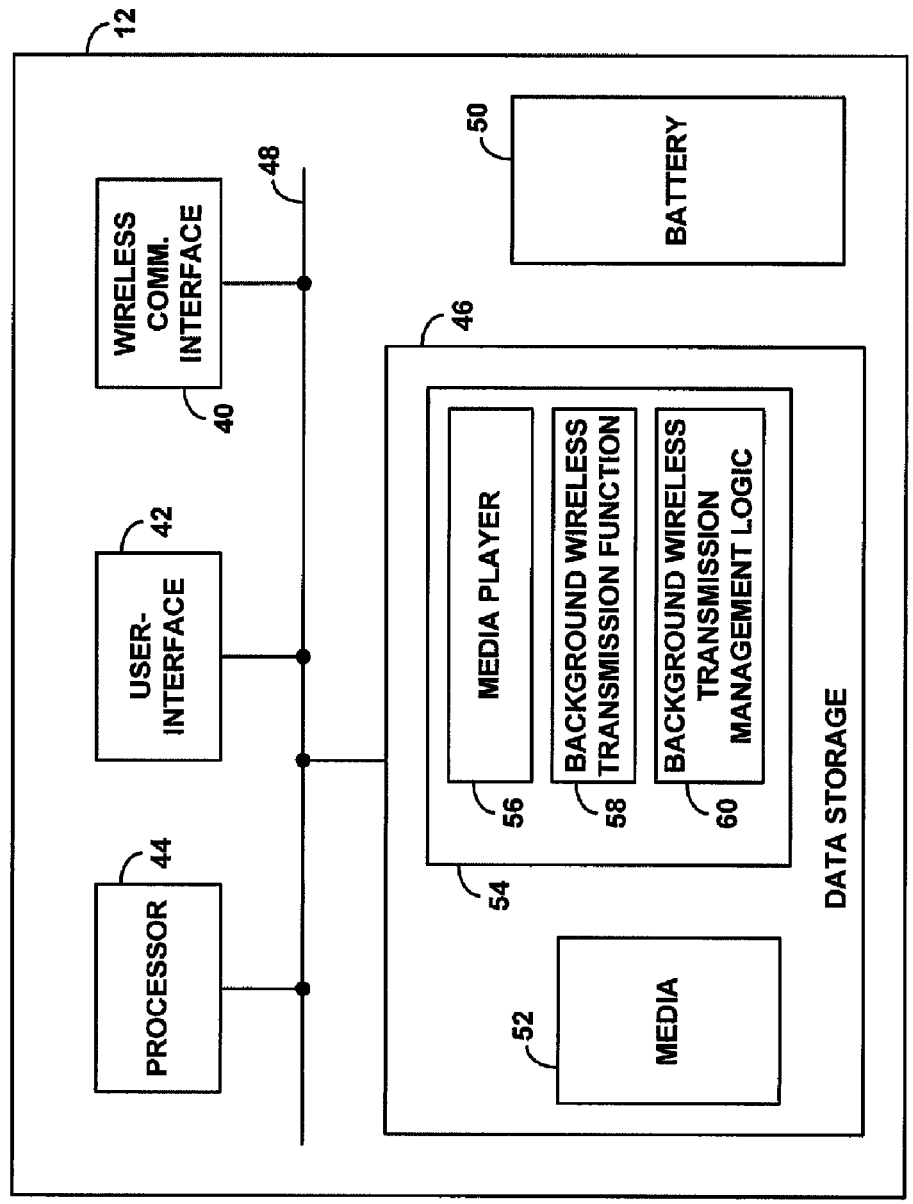
FIG. 2 is a simplified block diagram showing functional components of an exemplary portable device.

FIG. 2 is next a simplified block diagram of the exemplary portable device 12, showing some of the functional components that the device may include. As shown, the portable device 12 includes a wireless communication interface 40, a user interface 42, a processor 44, and data storage 46, all of which may be coupled together by a system bus, network, or other mechanism 48. Further, portable device 12 includes a battery 50 to power these various components, and so a user must often connect the device to a power supply to charge the battery 50.

Wireless communication interface 40 functions to facilitate communication with RAN 14 via air interface 16 according to an agreed protocol such one of the protocols noted above. As such, the wireless communication interface 40 may comprise a mobile station modem (MSM) chipset of the type manufactured by Qualcomm Incorporated, together with one or more antennas, or may take other forms. When portable device 12 is powered on, wireless communication interface 40 may normally function to engage in certain background wireless transmission, such as transmitting certain radio link control messages (e.g., power control messages, location reporting/request messages, etc.) or registration messages via the air interface 16 to RAN 14, at a certain frequency for instance.

User interface 42 functions to facilitate interaction with a user. Thus, user interface 42 may conventionally include input functions such as a keypad, microphone, and touch sensitive screen. Further, user interface 42 may conventionally include output functions such as a display screen and a loudspeaker or headset connection. Other user interfaces components are possible as well.

Processor 44 may comprise one or more general purpose processors (e.g., INTEL microprocessors) and/or one or more special purpose processors (e.g., digital signal processors or application specific integrated circuits). Data storage 46 in turn may comprise one or more volatile and/or non-volatile storage components, such as magnetic, optical, or organic storage for instance, and may be integrated in whole or in part with processor 44.

As shown, data storage 46 preferably contains media 52 and program logic 54. The media 52 may take the form of audio media (e.g., MP3 or other music files), video media (e.g., multi-media or video files), and gaming media (e.g., game application files), or any other type of media that can be played out to a user of the device via user interface 42 for instance. The program logic 54, on the other hand, includes machine language instructions or other logic executable by processor 44 to carry out various functions described herein.

As such, the program logic 54 may define certain basic functions of the device 12, such as a media player function 56 and background wireless transmission function 58, either or both of which can be integrated as functions of other application logic or other elements of device 12.

The media player function 56 may comprise one or more media player players executable by processor 44 to play media 52. For instance, the media player function 56 may include an MP3 player application or logic to play music or other audio files, an MPEG4 player application or other logic to play video or other multi-media file, a gaming application or other logic to play gaming media, and/or other media player functions now known or later developed. It should be understood that the media player function could also or instead include various hardware components, such as an analog tape player, disc player, or the like.

The background wireless transmission function 58 may comprise one or more program modules operates to trigger or otherwise cause the device 12 to engage in various background wireless transmissions. For example, the device 12 may be programmed with an instant messaging application, an push-to-talk application, and/or another group messaging application, and such an application may be programmed to periodically (e.g., at some set frequency or interval) generate and send presence update messages via RAN 14 to an application server on network 34, so as to enable the application server to keep track of the presence state of device 12. As another example, the device 12 may be programmed with a location tracking application that operates to periodically transmit to a network server a request for mobile station and/or a report of mobile station location, where such messages constitute another form of presence update messages. As still another example, the device 12 may be programmed with networking logic that operates to periodically send a re-registration request to a network server (such as a mobile-IP home agent) to maintain an IP address assignment. Other examples are possible as well.

At this point, it should be understood that device 12 may be set to normally engage in a certain extent of background wireless transmission. Some of the background wireless transmission may be generated by the wireless communication interface 40, such as by an MSM chipset for instance, and other background wireless transmission may be generated by application layer logic stored in data storage 46 and executed by processor 44 (with the actual transmission being carried out by the wireless communication interface 40). The device may be set to normally engage in other sorts or background wireless transmissions as well, for various purposes.

In accordance with the exemplary embodiment, program logic 54 further includes background wireless transmission management logic ("management logic") 60, which is executable by processor 44 to reduce the extent of background wireless transmissions by the device when the device enters a media player mode, and to revert the device to its normal extent of background wireless transmission when the device exits the media player mode. Management logic 60 thus advantageously helps the device conserve battery power by having the forego some or all of its background wireless transmissions when the device is functioning as a media player rather than as a wireless communication device. As with the other logical functions described herein, the management logic 60 could instead or in addition be provided as firmware and/or hardware logic.

Management logic 60 is preferably configured to detect when device 12 enters a media player mode, such as when a user directs the device to open/run a media player and/or when a user directs a media player to play media. To facilitate this, the management logic 60 may be integrated with the media player logic 56 itself. That way, upon execution of the media player or execution of a PLAY command or other media player function, the media player may carry out its normal functionality but may also invoke the management logic 60 so that the management logic 60 can responsively reduce the extent of background wireless transmission by the device. Similarly, upon closing of the media player or execution of a STOP command or similar function, the media player may close or otherwise carry out its normal functionality but may also invoke the management logic 60 so that the management logic 60 can responsive revert the device to its normal extent of background wireless transmission.

Alternatively or additionally, the management logic 60 could exist separately from any media player on the device but may provide a logical hook in the operating system of the device, in order to cause the operating system to call the management logic 60 whenever the device enters or exits a media player mode, such as whenever a media player application is opened, used, or closed. Upon opening or running of a media player, the management logic 60 may then take action to reduce background wireless transmission by the device, and upon stopping or closing of the media player, the management logic 60 may take action to revert the device to its normal extent of background wireless transmission.

The management logic 60 may reduce the extent of background wireless transmission in various ways. As an example, the management logic 60 may call various logical functions on device 12 or set various flags or values, to reduce or eliminate some or all of the background wireless transmissions by the device.

For instance, if the device runs a group messaging application or location tracking application that normally transmits presence updates to a network server at a certain frequency, the management logic 60 may call a function of that application in order to toggle a reduced rate of transmitting such presence updates, and the application may thus commence transmitting the presence updates at the reduced rate (i.e., less often than it normally does). Further or alternatively, the management logic 60 could set a flag or value in data storage that the application is set to reference as an indication of whether to send presence updates at a reduced rate or as an indication of the particular rate at which to send presence updates.

Similarly, if the device runs networking logic that normally transmits mobile-IP re-registration request messages to a home agent at a certain frequency, the management logic 60 may call a function of that networking logic to toggle a reduced rate of transmitting such re-registration request messages. (In the case of mobile-IP, one way to accomplish this may be to provide a longer lifetime timer in a registration message or directing the home agent to apply a longer lifetime timer, so that re-registration messages need be sent less frequently while avoiding release of the mobile-IP address assignment.) And further or alternatively, the management logic 60 could set a flag or value in data storage that the networking logic would reference as an indication of whether to send re-registration messages at a reduced rate or as an indication of the particular rate at which to send re-registration messages.

As another example, to the extent particular hardware components on the device function to engage in background wireless transmission, the management logic 60 may send interrupt signals or other directives to that hardware to cause the hardware to reduce its rate of background wireless transmission, or the management logic 60 may set various flags or values that the hardware logic would reference as a basis to determine whether to apply a reduced rate of background wireless transmission. For instance, the management logic 60 could signal to the wireless communication interface 40 to cause the interface 40 to reduce its rate of sending radio link control messages (e.g., registration messages, or location reporting messages), or the management logic 60 could set a flag or value that the interface 40 would reference to determine whether to apply the reduced rate of background wireless transmission and/or the extent of reduction to apply.

The management logic 60 may function to turn off background wireless transmission entirely, such as by signaling to or setting flags or values for reference by each element of the device 12 that normally engages in background wireless transmission. Furthermore or alternatively, the management logic 60 could turn off background wireless transmission entirely by turning off the wireless transceiver function (wireless communication interface 40) of the device 12. Applying software to turn off a wireless transceiver of a portable device while maintaining its other functionality is known in the art as a way to put a cell phone into an "airplane mode" so that it can be used on an airplane in flight without violating governmental regulations regarding use of wireless communication technology in flight. Thus, the same sort of software functions can be applied in this case. Advantageously, however, management logic 60 would carry out the function in response to invocation of the media player function. Thus, when a user requests the device to invoke its media player, not only would the device responsively invoke its media player, but the device may also responsively turn off its wireless transmission functionality so as to conserve battery power (and, if on an aircraft, conveniently also enter the airplane mode).

It should be understood that management logic 60 can carry out similar functions in order to automatically revert the device to its normal extent of background wireless transmission in response to the device exiting the media player mode (e.g., upon closing or stopping of the media player). In particular, if the management logic 60 had signaled to one or more applications or hardware components, and/or set flags or values, in order to effect certain reduction in background wireless transmission when the device entered the media player mode, the management logic 60 would preferably signal to the same application(s) or hardware component(s) and/or change the flags and or values, in order to effect a reversion to the normal extent of background wireless transmission by the device when the device exits the media player mode. To facilitate this, the management logic 60 may keep a record of the changes that it made or effected so that the management logic 60 can undo those changes when necessary. Further, the device preferably reverts to its normal state when it first powers up or is reset.

To implement the exemplary embodiment in practice, various changes may be made to various applications and hardware components on the device 12. For instance, applications or hardware that engage in background wireless transmission may be modified to have a normal mode in which they engage in background wireless transmission at a particular frequency and a reduced mode in which they engage in background wireless transmission at a reduced frequency (or in which they do not engage in some or all background wireless transmission at all), they may be modified to refer to various flags or settings to determine how often to engage in such transmissions, and/or they may be modified to accept directives or other indications from the management logic 60.

3. Exemplary Operation

Figure 3:
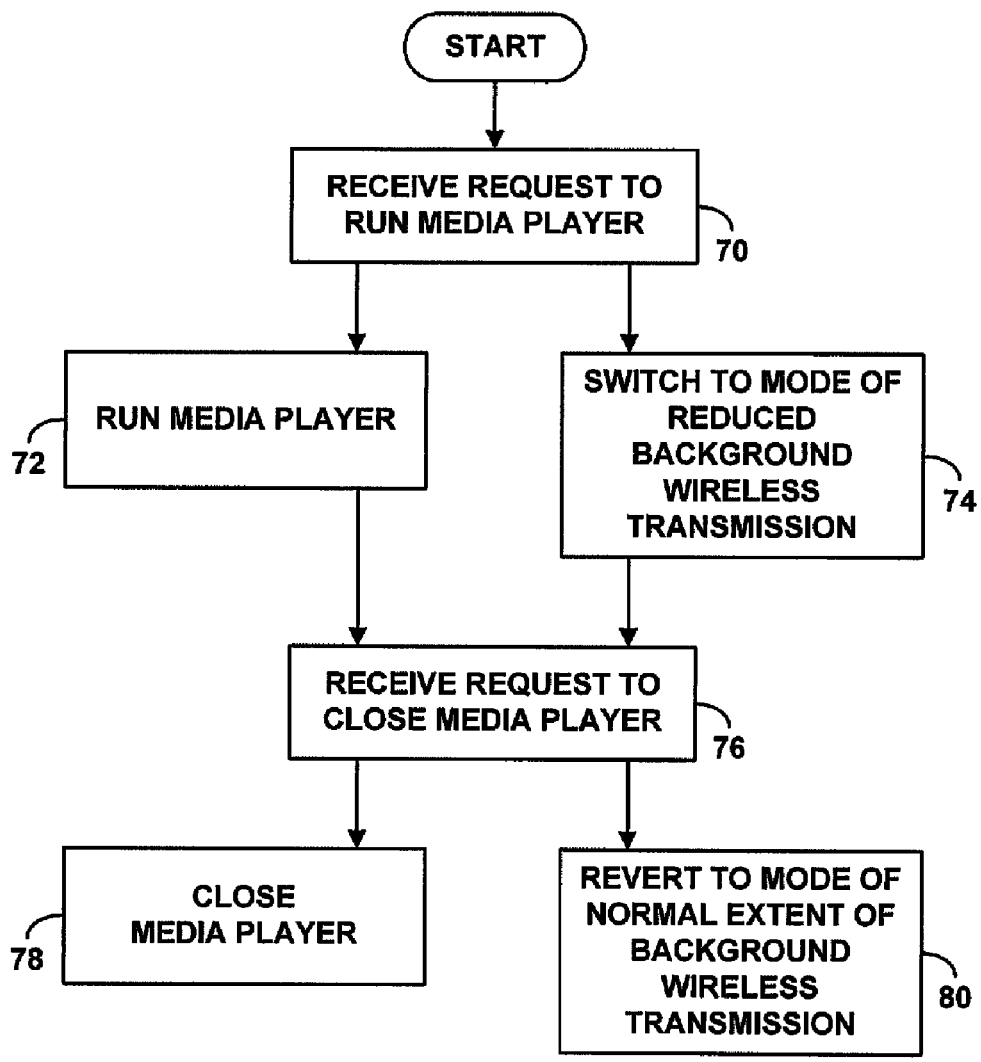
FIG. 3 is a flow chart depicting functions that can be carried out by the exemplary portable device in accordance with the exemplary embodiment.

FIG. 3 is a flow chart depicting functions that device 12 can carry out in accordance with the exemplary embodiment. As shown in FIG. 3, at step 70, device 12 receives from a user (via user interface 42) a request to run a media player application, such as by the user invoking a media player open or play function. At step 72, as a normal response to this request, the device 12 then runs the media player application. But further, at step 74, the device also responsively switches the device from a mode of normal background wireless transmission to a mode of reduced background wireless transmission in order to conserve battery power while the media player application is running.

At some point thereafter, at step 76, the device receives from the user a request to close the media player application, such as by the user invoking a media player close or stop function. At step 78, as a normal response to this request, the device 12 then closes or stops the media player. But further, at step 80, the device also responsively reverts from the mode of reduced background wireless transmission to the mode of normal background wireless transmission.

As explained above, the present invention can advantageously help conserve battery power by automatically switching a portable device to a mode of reduced background wireless transmission when the device is functioning as a media player and thus when there is little if any reason for the device to be carrying out background wireless transmissions. Consequently, a user of the device may benefit from increased battery life and thus reduced burden to charge the device.

4. Conclusion

An exemplary embodiment of the invention has been described above. Those of ordinary skill in the art will appreciate, however, that modifications may be made while remaining within the scope of the invention as defined by the claims.

We claim:

1. A portable communication device comprising a wireless transceiver for engaging in wireless communications and a media player for playing locally stored media to a user of the device, the device normally engaging in a certain extent of background wireless transmission via the wireless transceiver, wherein the certain extent of background wireless transmission comprises a certain frequency of wirelessly transmitting registration messages, wherein, in response to invocation of the media player, the device automatically switches to a mode of reduced background wireless transmission comprises switching to a mode of wirelessly transmitting the registration messages at a reduced frequency, to thereby conserve battery power, and wherein the device stays in the mode of reduced background wireless transmission for as long as the media player is running, and the device automatically reverts to normally engage in the certain extent of background wireless transmission when the media player stops running.

2. The device of claim 1, wherein the certain extent of background wireless transmission comprises a certain frequency of wirelessly transmitting presence update messages, and wherein switching to the mode of reduced background wireless transmission comprises switching to a mode of wirelessly transmitting the presence update messages at a reduced frequency.

3. The device of claim 1, wherein the certain extent of background wireless transmission comprises a certain frequency of wirelessly transmitting power control messages, and wherein switching to the mode of reduced background wireless transmission comprises switching to a mode of wirelessly transmitting the power control messages at a reduced frequency.

4. The device of claim 1, wherein switching to the mode of reduced background wireless transmission comprises turning off the wireless transceiver and thereby eliminating background wireless transmission.

5. The device of claim 1, wherein the media player comprises a media player program application executable by a processor of the device, and wherein invocation of the media player comprises running the media player program application.

6. The device of claim 1, wherein invocation of the media player comprises receiving user input specifically designating the media player program application to be run.

7. The device of claim 6, wherein receiving the user input specifically designating the media player program application to be run comprises presenting on a user interface of the device a link to the media player program application, and receiving user selection of that link.

8. The device of claim 1, wherein invocation of the media player comprises directing the media player to play media.

9. The device of claim 1, wherein the device is a cellular telephone having the media player, and the media player comprises a program application stored in data storage and executable by a processor of the cellular telephone.

10. The device of claim 1, wherein the media comprises media selected from the group consisting of audio media, video media, and gaming media.

11. The device of claim 1, wherein the device has a device housing containing a processor, data storage, and program instructions stored in the data storage and executable by the processor to perform the automatic switching to the reduced mode in response to the invocation of the media player, and wherein the device is a handheld device.

12. The device of claim 1, wherein the wireless transceiver comprises a cellular wireless transceiver operable to communicate over a cellular air interface with a serving radio access network.

13. A portable communication device comprising a wireless transceiver for engaging in wireless communications and a media player for playing locally stored media to a user of the device, the device normally engaging in a certain extent of background wireless transmission via the wireless transceiver, wherein, in response to invocation of the media player, the device automatically switches to a mode of reduced background wireless transmission, to thereby conserve battery power, and wherein in response to termination of the media player, the device automatically switches back from the mode of reduced background wireless transmission, and wherein the certain extent of background wireless transmission comprises a certain frequency of wirelessly transmitting registration messages, and wherein switching to the mode of reduced background wireless transmission comprises switching to a mode of wirelessly transmitting the registration messages at a reduced frequency.

14. The device of claim 13, wherein the media player comprises a media player program application executable by a processor of the device, and wherein invocation of the media player comprises running the media player program application.

15. The device of claim 13, wherein invocation of the media player comprises receiving user input specifically designating the media player program application to be run.

16. The device of claim 13, wherein the device is a cellular telephone having the media player, and the media player comprises a program application stored in data storage and executable by a processor of the cellular telephone.

17. A portable communication device comprising a wireless transceiver for engaging in wireless communications and a media player for playing locally stored media to a user of the device, the device normally engaging in a certain extent of background wireless transmission via the wireless transceiver, wherein, in response to invocation of the media player, the device automatically switches to a mode of reduced background wireless transmission, to thereby conserve battery power, and wherein in response to termination of the media player, the device automatically switches back from the mode of reduced background wireless transmission, wherein the certain extent of background wireless transmission comprises a certain frequency of wirelessly transmitting presence update messages, and wherein switching to the mode of reduced background wireless transmission comprises switching to a mode of wirelessly transmitting the presence update messages at a reduced frequency, wherein the certain extent of background wireless transmission further comprises a certain frequency of wirelessly transmitting registration messages, and wherein switching to the mode of reduced background wireless transmission further comprises switching to a mode of wirelessly transmitting the registration messages at a reduced frequency.

18. The device of claim 17, wherein the media player comprises a media player program application executable by a processor of the device, and wherein invocation of the media player comprises running the media player program application.

19. The device of claim 17, wherein invocation of the media player comprises receiving user input specifically designating the media player program application to be run.

* * * * *